(12) United States Patent
Niwa et al.

(10) Patent No.: US 11,369,884 B2
(45) Date of Patent: Jun. 28, 2022

(54) DISTRIBUTION SERVER, DISTRIBUTION SYSTEM, DISTRIBUTION METHOD, AND PROGRAM

(71) Applicant: DWANGO Co., Ltd., Tokyo (JP)

(72) Inventors: Kazuomi Niwa, Tokyo (JP); Takashi Kojima, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 0 days.

(21) Appl. No.: 15/734,929

(22) PCT Filed: Aug. 8, 2019

(86) PCT No.: PCT/JP2019/031497
§ 371 (c)(1),
(2) Date: Dec. 3, 2020

(87) PCT Pub. No.: WO2020/045041
PCT Pub. Date: Mar. 5, 2020

(65) Prior Publication Data
US 2021/0220747 A1  Jul. 22, 2021

(30) Foreign Application Priority Data

Aug. 30, 2018 (JP) .............................. JP2018-161369

(51) Int. Cl.
*A63F 13/86* (2014.01)
*A63F 13/335* (2014.01)
(Continued)

(52) U.S. Cl.
CPC ............ *A63F 13/86* (2014.09); *A63F 13/335* (2014.09); *A63F 13/497* (2014.09); *A63F 13/52* (2014.09); *A63F 13/5375* (2014.09); *A63F 13/87* (2014.09)

(58) Field of Classification Search
CPC ........ A63F 13/86; A63F 13/52; A63F 13/497; A63F 13/335; A63F 13/5375; A63F 13/87
See application file for complete search history.

(56) References Cited

U.S. PATENT DOCUMENTS

| 6,076,100 A  * | 6/2000 | Cottrille .................... G06F 9/54 |
| | | 709/203 |
| 10,300,394 B1 * | 5/2019 | Evans ...................... G06F 3/048 |

(Continued)

FOREIGN PATENT DOCUMENTS

| CA | 3046417 A1 | 6/2018 |
| CN | 110121379 A | 8/2019 |

(Continued)

OTHER PUBLICATIONS

Akihiko Koizuka, Creativity of Nico Nico Douga, Information Processing, Apr. 15, 2012, vol. 53 No.5, pp. 483-488.

(Continued)

*Primary Examiner* — Thomas J Hong
*Assistant Examiner* — Carl V Larsen
(74) *Attorney, Agent, or Firm* — Dorsey & Whitney LLP

(57) ABSTRACT

Provided is a distribution server and the like that distributes a gameplay screen of an online game, and displays a comment posted by a viewer in a display mode according to a gameplay status. A distribution server 100 distributes a gameplay screen of an online game. The distribution server 100 includes. a status obtainer 141 configured to obtain a gameplay status; a comment receiver 142 configured to receive a comment posted by a viewer; a distribution unit 143 configured to distribute a distribution screen containing the gameplay screen and the comment having been received by the comment receiver 142, and a display mode controller (Continued)

144 configured to control a display mode of the comment, according to the gameplay status obtained by the status obtainer 141.

18 Claims, 6 Drawing Sheets

(51) Int. Cl.
*A63F 13/497* (2014.01)
*A63F 13/52* (2014.01)
*A63F 13/5375* (2014.01)
*A63F 13/87* (2014.01)

(56) References Cited

U.S. PATENT DOCUMENTS

| | | | |
|---|---|---|---|
| 2005/0138560 A1* | 6/2005 | Lee | H04N 21/2547 715/719 |
| 2009/0132905 A1* | 5/2009 | Hoshino | G06F 16/68 715/230 |
| 2013/0163948 A1* | 6/2013 | Kano | H04N 5/775 386/230 |
| 2014/0067842 A1* | 3/2014 | Chen | G06F 16/24 707/758 |
| 2014/0235336 A1 | 8/2014 | Morimoto et al. | |
| 2015/0127603 A1* | 5/2015 | Cohen | H04L 51/046 707/608 |
| 2016/0287987 A1* | 10/2016 | Onda | A63F 13/86 |
| 2017/0006074 A1* | 1/2017 | Oates, III | H04L 65/4076 |
| 2017/0006322 A1* | 1/2017 | Dury | A63F 13/49 |
| 2017/0115834 A1* | 4/2017 | Ota | G06F 40/42 |
| 2017/0136367 A1* | 5/2017 | Watari | A63F 13/63 |
| 2018/0161682 A1 | 6/2018 | Myhill | |
| 2018/0367484 A1* | 12/2018 | Rodriguez | H04L 67/36 |

FOREIGN PATENT DOCUMENTS

| | | |
|---|---|---|
| EP | 2769756 A1 | 8/2014 |
| EP | 3131053 A1 | 2/2017 |
| JP | 2014158620 A | 9/2014 |
| JP | 2015163255 A | 9/2015 |
| JP | 2016072651 A | 5/2016 |
| JP | 2016189804 A | 11/2016 |
| JP | 2016201714 A | 12/2016 |
| JP | 2017090478 A | 5/2017 |
| JP | 2018046877 A | 3/2018 |
| WO | 2015156177 A1 | 10/2015 |
| WO | 2018104791 A1 | 6/2018 |

OTHER PUBLICATIONS

Decision to Grant a Patent, dated Jul. 29, 2019 Application number: Japanese Patent Application No. 2018-161369 Title of the invention: Distribution Server, Distribution System, Distribution Method, and Program.
Notice of Reasons for Refusal, dated Mar. 25, 2019: Application number: Japanese Patent Application No. 2018-161369.
Notice of Reasons for Refusal, dated Nov. 21, 2018; Application number: Japanese Patent Application No. 2018-161369.
"Estimation of Video Feature Scene by Using Viewers Time Synchronization Comments" By Tomohiko Suenaga et al; DEIM Forum 2018 E3-4, Final Festschrift, The 10th Forum on Data Engineering and Information Management, (The 16th Annual Japan Database Society Meeting),[Online], Apr. 2, 2018 [Searched on Oct. 15, 2019], Internet: <URL: http://db-event.jpn.org/deim2018/data/papers/267. pdf>.
[English Translation] International Search Report and Written Opinion dated Oct. 29, 2019 for PCT Application No. PCT/JP2019/031497.

* cited by examiner

FIG.3
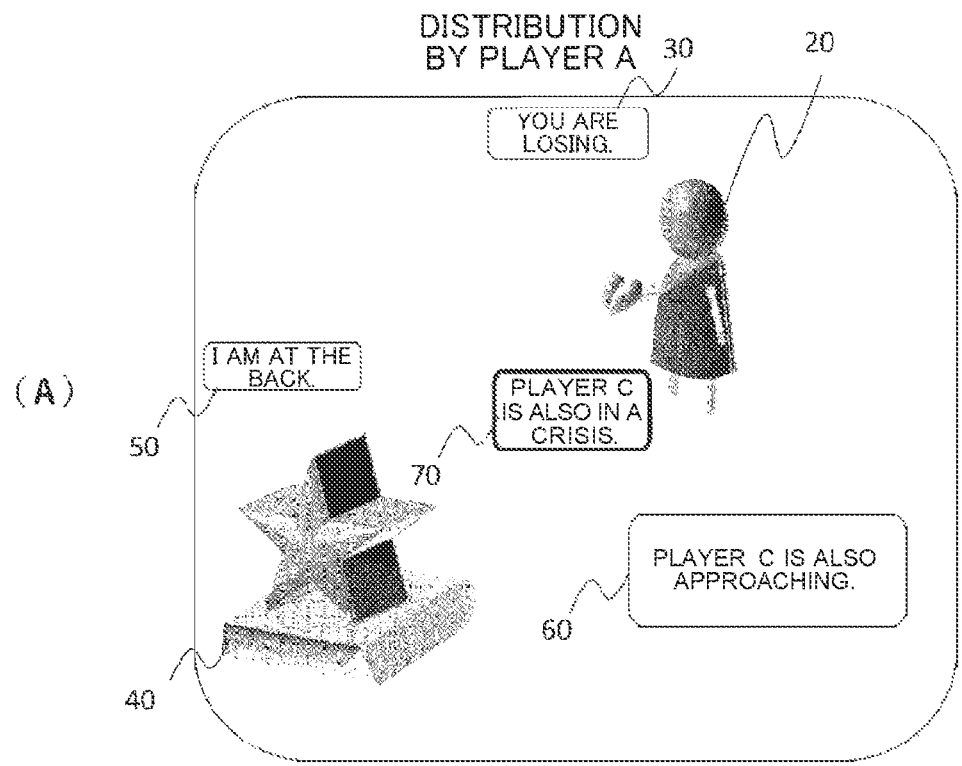
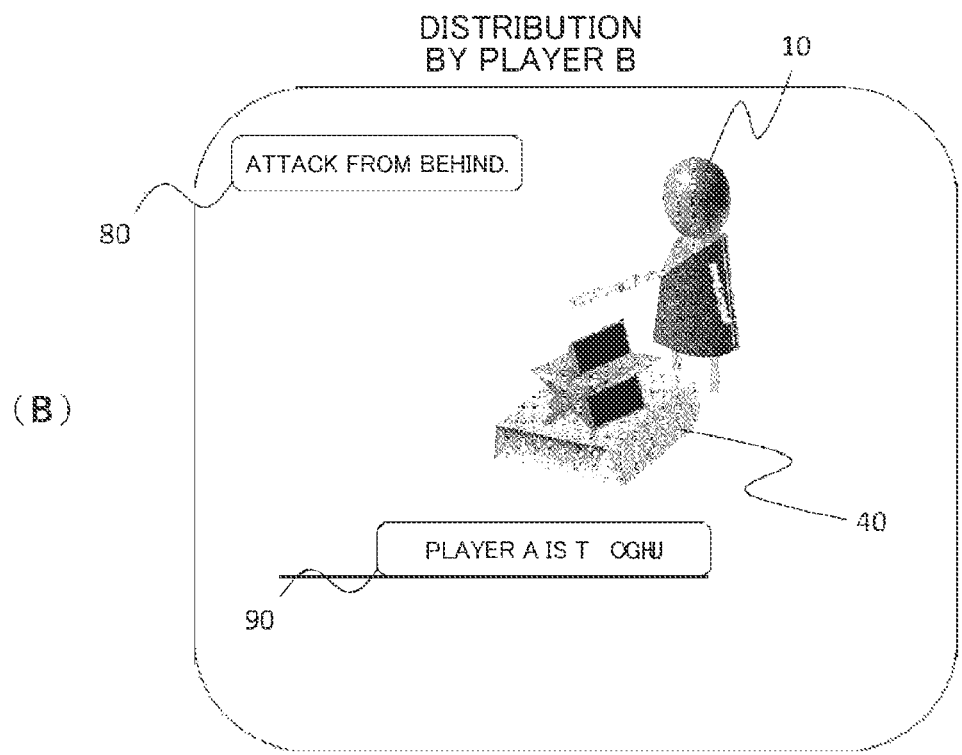

DISTRIBUTION SERVER, DISTRIBUTION SYSTEM, DISTRIBUTION METHOD, AND PROGRAM

RELATED APPLICATIONS

This application is a 371 National Stage application of International Application No. PCT/JP2019/031497, filed Aug. 8, 2019, which claims priority to Japanese Patent Application No. 2018-161369 filed on Aug. 30, 2018. The aforementioned applications are incorporated herein by reference, in its entirety, for any purposes.

TECHNICAL FIELD

The present disclosure relates to a distribution server, a distribution system, a distribution method, and a program.

BACKGROUND ART

There has been a known technology to distribute a video image of an online game through a network and distribute comments posted by viewers or a browsing people.

For example, Patent Document 1 discloses a server system such that, when the number of comments posted by browsing people with the same substance exceeds a predetermined number in a distribution screen of a player-posted gameplay movie, these comments are displayed in a large size.

This server system distinguishes positive comments from negative comments posted by browsing people and displays them in different colors on a browser screen. Further, this server system provides predetermined presentations according to the number of comments posted or the type of each comment. Examples of the predetermined presentations include changing of the view point of a virtual camera, changing of the background image, a decoration image, or an effect.

CITATION LIST

Patent Documents

Patent Document 1: Japanese Unexamined Patent Publication No. 2016-189804

SUMMARY OF THE INVENTION

Technical Problem

The server system of Patent Document 1 displays comments in a large size when the number of comments with the same substance exceeds a predetermined number, or displays positive comments and negative comments in different colors. However, such a configuration does not display comments in a display mode according to a gameplay status.

In view of such a circumstance, an object of the present disclosure is to provide a distribution server and the like that distribute a gameplay screen of an online game and display a comment posted from a viewer in a display mode according to a gameplay status.

Solution to the Problem

To achieve the above object, a distribution server related to a first aspect of the present disclosure is a distribution server configured to distribute a gameplay screen of an online game, including: a status obtainer configured to obtain a gameplay status; a comment receiver configured to receive a comment posted by a viewer; a distribution unit configured to distribute a distribution screen containing the gameplay screen and the comment received by the comment receiver; and a display mode controller configured to control a display mode of the comment, according to the gameplay status obtained by the status obtainer.

To achieve the above object, a distribution system related to a second aspect of the present disclosure is A distribution system comprising a distribution server configured to distribute a gameplay screen of an online game and a viewer terminal for viewing the gameplay screen distributed, wherein: the distribution server receives a comment posted by a viewer, and distributes a distribution screen containing the gameplay screen and the comment having been received; a distributor terminal used by a player and the viewer terminal display the distribution screen containing the gameplay screen and the comment having been received by the comment receiver; and a display mode of the comment is controlled according to the gameplay status.

To achieve the above object, a distribution method related to a third aspect of the present disclosure is a distribution method of distributing a gameplay screen of an online game, including the steps of: obtaining a gameplay status; receiving a comment posted by a viewer, distributing a distribution screen containing the gameplay screen and the comment received in the step of receiving the comment; and controlling a display mode of the comment, according to the gameplay status obtained in the step of obtaining the gameplay status.

To achieve the above object, a program related to a fourth aspect of the present disclosure is a program causing a computer configured to distribute a gameplay screen of an online game to function as a status obtainer configured to obtain a gameplay status; a comment receiver configured to receive a comment posted by a viewer; a distributor configured to distribute a distribution screen containing the gameplay screen and the comment received by the comment receiver, and a display mode controller configured to control a display mode of the comment, according to the gameplay status obtained by the status obtainer.

Advantages of the Invention

According to the present disclosure, it is possible to provide a distribution server and the like that distribute a gameplay screen of an online game, and displays a comment posted by a viewer in a display mode according to a gameplay status.

BRIEF DESCRIPTION OF THE DRAWINGS

FIG. 3 is a diagram illustrating specific examples of distribution screens of players, wherein an illustration (A) illustrates a distributed screen of a player A, and an illustration (B) illustrates a distributed screen of a player B.

DESCRIPTION OF EMBODIMENTS

Hereinafter, an embodiment of the present disclosure will be described with reference to the accompanying drawings. It should be noted that the embodiments described below do not unduly limit the scope of claims of the present disclosure. Further, not all configurations of the embodiments described herein are essential in the present disclosure.

Embodiment

Figure 1:
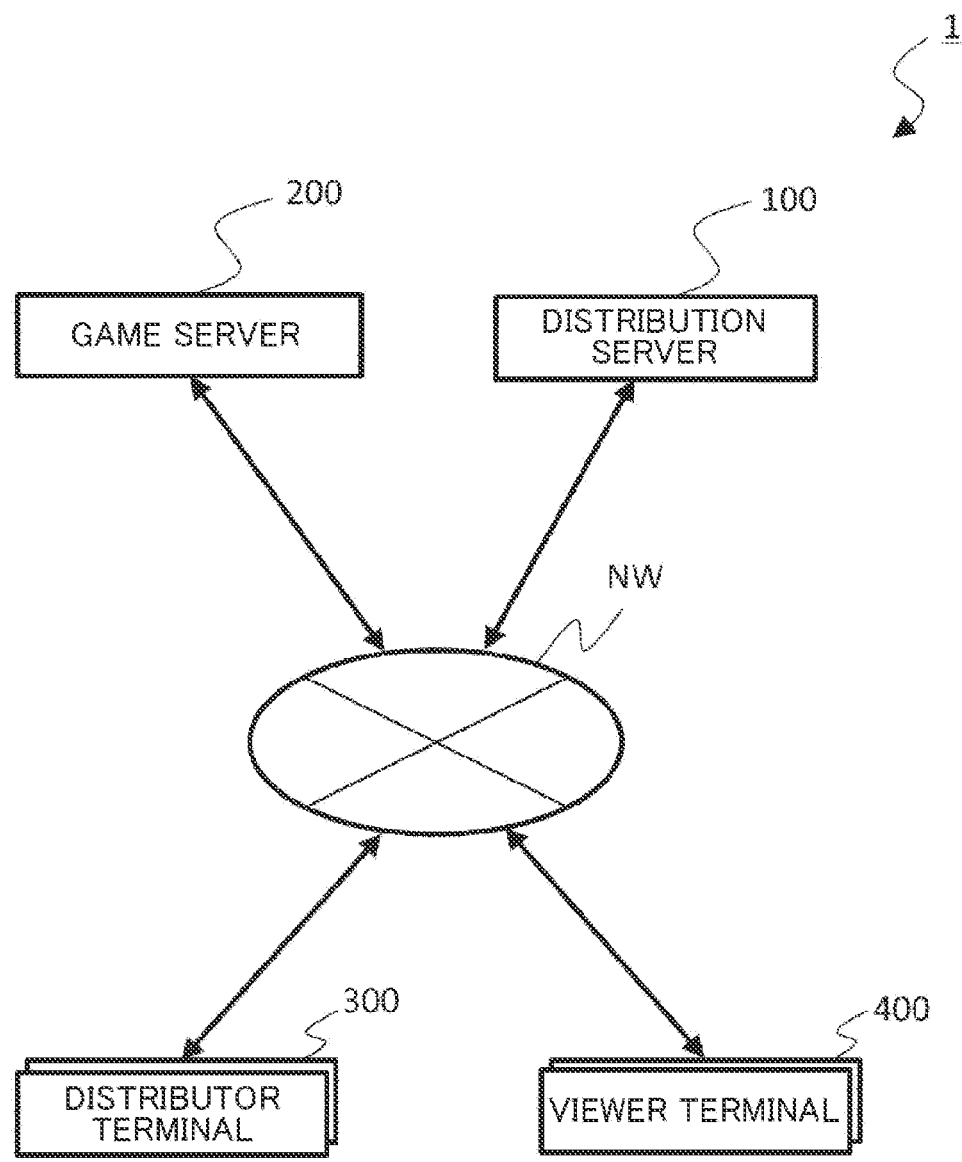
FIG. 1 is a diagram illustrating an exemplary configuration of a distribution system in accordance with an embodiment.

As illustrated in FIG. 1, a distribution system 1 according to the present embodiment includes: a distribution server 100, a game server 200, a plurality of distributor terminals 300, and a plurality of viewer terminals 400. The distribution server 100, the game server 200, the plurality of distributor terminals 300, and the plurality of viewer terminals 400 are connected and in communication through a network NW. The network NW is, for example, a world area network (WAN).

The distribution server 100 provides a distribution service through the network NW. The distribution server 100 distributes, as a live broadcast, a distribution screen including a gameplay screen of a player (distributor) and a comment received from a viewer to the distributor terminal 300 and the viewer terminals 400. It should be noted that the distribution includes not only the distribution by the player, but also official distribution. What distribution to watch is selected by each viewer.

The distributor terminal 300 used by the player displays the distribution screen of that player. In other words, the distribution screen distributed to the distributor terminal 300 is fundamentally the same as the distribution screen distributed to each viewer terminal 400. However, since there are a function that is only available to the distributor and a function that is only available to the viewer, displayed content will be partially different depending on which function is available.

The game server 200 provides an online game via the network NW. The online game is played by a player (distributor) using the distributor terminal 300. The administrator of the game server 200 (i.e., online game provider) may be the same as or different from the administrator of the distribution server 100 (i.e., distribution service provider).

The online game may be a game in which a plurality of players simultaneously participate and cooperate with each other to play the game, or a game in which a player competes against another player. In one preferred embodiment, the online game contains an element of an information strategy. This way, a plurality of players distributing their gameplay screens and viewers posting comments including useful information for the distribution can make the game more exciting.

The distributor terminal 300 is used by the distributor who plays the online game and distributes the gameplay screen of the online game. The distributor terminal 300 is a device having a communication function, such as a personal computer, a tablet terminal, a smartphone, and the like.

The viewer terminal 400 is a device having a communication function, such as a personal computer, a tablet terminal, a smartphone, and the like. The viewer terminal 400 is used by a viewer who views the distribution screen indicating the status of the game played by the player (gameplay status).

<Configuration of Distribution Server>

Figure 2:
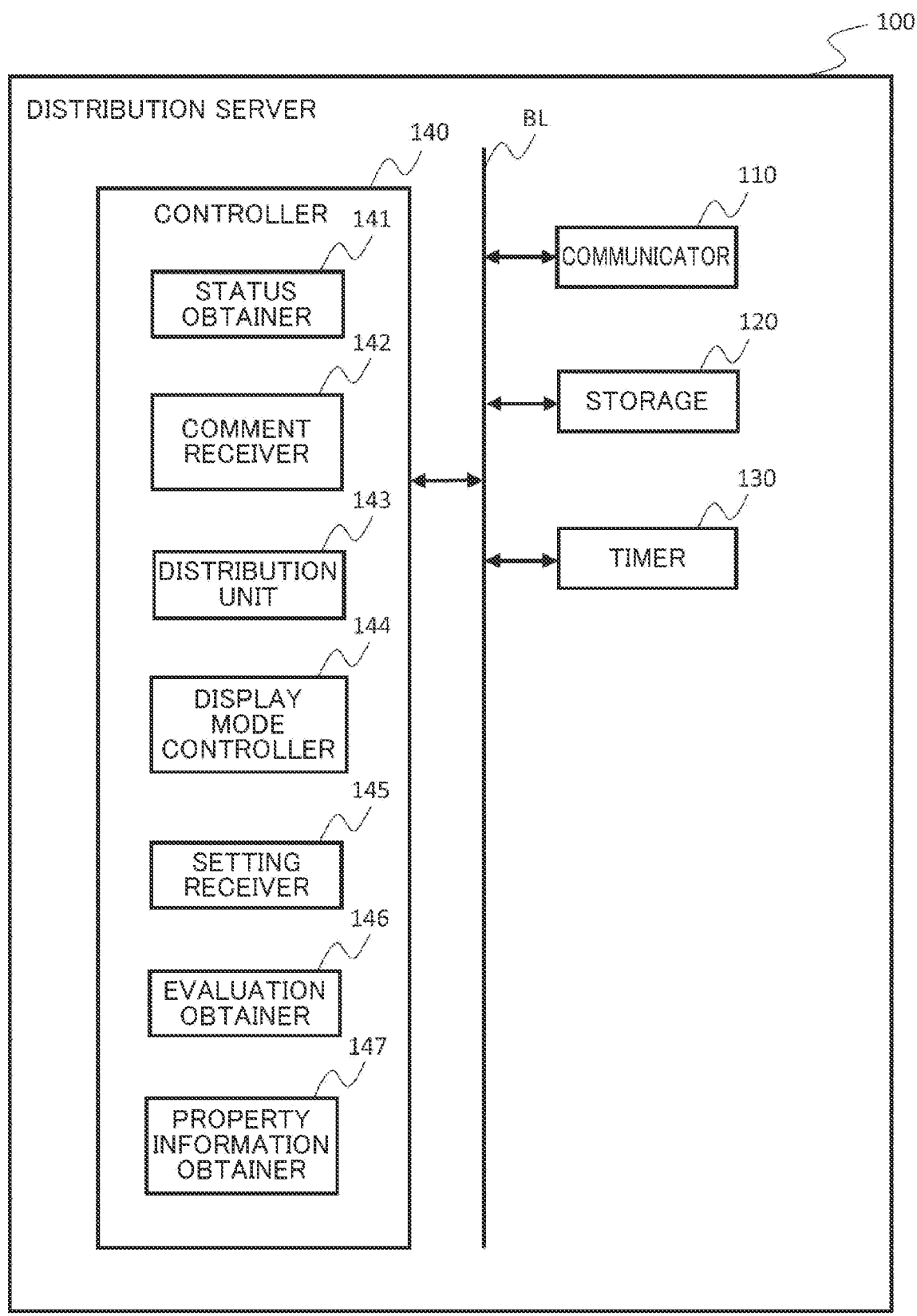
FIG. 2 is a block diagram illustrating an exemplary configuration of a distribution server in accordance with the embodiment.

The following describes in detail the configuration of the distribution server 100. As illustrated in FIG. 2, the distribution server 100 includes a communicator 110 configured to perform communication with another device, a storage 120 configured to store various types of data, a timer 130 configured to measure the time, and a controller 140 configured to control the entire device. These configuring elements are connected to one another through a bus line BL.

The communicator 110 is a communication interface including a Network Interface Card Controller (NIC) for performing wired or wireless communication. The communicator 110 communicates with the distributor terminals 300 and the viewer terminals 400 through the network NW.

The storage 120 is configured by Random Access Memory (RAM), Read Only Memory (ROM), and the like. The storage 120 stores a program for executing various control processes and various types of data.

The timer 130 is configured by an oscillation circuit and a variable Phase Locked Loop (PLL) for generating a clock signal, and a counter circuit that counts the number of pulses in the clock signal, and the like. The timer 130 measures the time based on the number of pulses counted.

The controller 140 is configured by a Central Processing Unit (CPU) and the like. The controller 140 controls the entire operation of the distribution server 100 by executing the program stored in the storage 120. The controller 140 executes various controls at timings based on the number of pulses counted by the timer 130. Further, the controller 140 counts the distribution time or determines whether a predetermined time period (e.g., scheduled distribution time) has elapsed, based on the time measured by the timer 130.

The following describes a functional configuration of the controller 140. The controller 140 functions as a status obtainer 141, a comment receiver 142, a distribution unit 143, a display mode controller 144, a setting receiver 145, an evaluation obtainer 146, and a property information obtainer 147.

The status obtainer 141 obtains the gameplay status. For example, the status obtainer 141 obtains the gameplay status based on image analysis of the gameplay screen or audio analysis of sounds during the gameplay. In this case, the gameplay screen and the sounds during the gameplay may be obtained from the distributor terminal 300 or the game server 200, through the communicator 110. In the image analysis or the audio analysis, information of a pattern such as an image pattern or an audio pattern is stored in the storage 120, and the status obtainer 141 distinguishes the gameplay status by comparing the information of the pattern with the image or the audio of the game being played.

The status obtainer 141 may obtain the gameplay status based on an input by a game master (administrator side). For example, the distribution server 100 may have an input unit that receives such an input, or may communicate through the communicator 110 with an administrator-side communication terminal that accepts such an input.

The status obtainer 141 may obtain the gameplay status from an analysis result of substance of a comment received by the comment receiver 142. For example, when a comment containing a specific keyword is posted, or the number of comments containing such a keyword reaches a predetermined number, the status obtainer 141 may obtain the gameplay status that corresponds to such a condition. This is achievable by, for example, storing, in advance, a table of predetermined conditions and their corresponding gameplay statuses in the storage 120, and having the status obtainer 141 extract the gameplay status from the table. Examples of the predetermined conditions include a condition related to the number of comments and a condition related to a comment substance. It should be noted that the status obtainer 141 may obtain the gameplay status by receiving from the game server 200 information related to the gameplay status such as the stamina, the status, the equipment, the ability value, and the like of the character and the like representing the player.

The comment receiver 142 communicates with each viewer terminal 400 through the communicator 110, and receives comments for each set of distribution posted by viewers. It should be noted that the comment receiver 142 may be configured to communicate with the distributor terminal 300 and receive comments posted by the distributor.

The distribution unit 143 distributes the gameplay screen obtained and the distribution screen including comments received by the comment receiver 142. Through the communicator 110, the distribution unit 143 may directly obtain the gameplay screen corresponding to the player from the game server 200 or indirectly obtain the gameplay screen corresponding to the player from the distributor terminal 300. Further, the distribution unit 143 distributes, as audio information, the sound of the game and an audio input by the distributor to the distributor terminal 300.

The display mode controller 144 controls the display mode of each comment in the distribution screen according to the gameplay status obtained by the status obtainer 141. For example, according to the gameplay status, the display mode controller 144 controls the display mode of at least one of the color, the size, the font, or the outer comment frame in the distribution screen.

The display mode controller 144 may add an identification or an effect to a comment on the distribution screen, according to the gameplay status obtained by the status obtainer 141. The identification is, for example, a symbol, a mark, or the like added to the comment. The effect is, for example, a change in the outer comment frame, lighting, blinking, or the like.

Specifically, the display mode controller 144 controls the display mode of each comment according to a result of image analysis or audio analysis. This control is targeted to the display mode of each comment in a default state.

The display mode controller 144 also controls the display mode of each comment according to the substance of the comment. This control is not targeted to the display mode of the comment in the default state. For example, when a posted comment includes a predetermined keyword or information indicating an urgent situation, the display mode of such a comment is differentiated from the display mode in the default state. That is, this control may be applied independently or in combination with the above-mentioned control of the display mode of the comment in the default state.

Further, an overall control based on the gameplay status (e.g., based on image analysis or audio analysis) changes the color, while an individual control based on substance of the comment changes the size, rather than the color. With the two different controls controlling different modes as described, the user is able to recognize that both of the controls are applied in combination.

Even if the overall control and the individual control both control the same display mode, the user is able to recognize both of the controls are applied in a combination, by displaying the comment, which has been applied the two controls, in the display mode resulting from the combination of the two controls. For example, to a comment displayed in white, the display mode controller 144 may perform a combination of a control based on the gameplay status (changes the color to red) and a control based on the substance of the comment (change the color to blue) so as to display the comment in purple. Similarly, to a comment whose size is 10 points, the display mode controller 144 may perform a combination of a control based on the gameplay status (increase the size by 1 point) and a control based on the substance of the comment (increase the size by 1 point) so that the size of the comment displayed becomes 12 points.

The display mode controller 144 may display a comment in a specific color when the gameplay status obtained by the status obtainer 141 indicates an urgent situation. In a case where this control is performed based on the gameplay status (based on image analysis or audio analysis), the control may be applied to every comment. In a case where this control is performed based on an analysis of the substance of the comment, the control may be applied to a comment meeting a condition of urgency.

The urgent situation includes at least one of the following situations: a situation where an enemy is approaching, a situation of being attacked by an enemy, a situation where the player is in a crisis, a situation where a game of an own-side player is over or the own-side player is in a crisis. The situation where an enemy is approaching is, for example, a case where the distance from another player is within a predetermined range, a case where the player is just about encountering an enemy, a case of receiving an attack from a far distance, and the like.

The setting receiver 145 receives a setting of categorization according to the gameplay status. This setting is reflected to the table stored in the storage 120. With the setting of categorization is done, the display mode controller 144 causes a comment related to a gameplay status to be displayed in a display mode that reflects a setting of categorization. The substance of the setting of categorization is received, for example, from the distributor terminal 300 used by the player. Instead of having a user set the setting of categorization, the setting of categorization may be set in advance by the distribution service provider and categorization automatically takes place according to the gameplay status.

This way, the display mode controller 144 is able to cause a comment posted by the viewer to be displayed according to the category of the comment. For example, the color of a comment or its frame is displayed on the gameplay screen in a color corresponding to the category, such as amber for a comment while the player is in a battle and red for a comment when the player is on the verge of death.

The display mode controller 144 may further change the display mode based on analysis of text of each comment. For example, the display mode controller 144 causes a comment containing information indicating an enemy is approaching to be displayed in green, and causes a comment containing information indicating another player is on the verge of death to be displayed in a specific color (e.g., red). The display mode controller 144 causes a comment containing information related to own-side players (a decrease in the number of own-side players or request for a backup) to be displayed in blue. As described, instead of having a user post comments, selectively using different colors according to a local rule, the distribution server 100 selectively uses different colors according to the category. Since comments are displayed in different colors according to the categories, the player is able to quickly pick up information that he/she needs to know.

It should be noted that the setting of categorization according to the analysis of the substance of the comment may be different depending on the gameplay status. That is, the display mode of the comment may be varied according to both the gameplay status at the time of posting the comment and the analysis result of the comment.

The evaluation obtainer 146 obtains an evaluation of the reliability of each comment from the viewer or the player. When the reliability evaluation of a comment is obtained by the evaluation obtainer 146, the display mode controller 144 controls the display mode of comments posted thereafter by the same contributor according to the evaluation.

For example, when a doubtful comment is posted, the viewer or the distributor evaluates the comment by labeling "True" or "False" to the comment, and the evaluation obtainer 146 obtains that evaluation of the comment. Then, the display mode controller 144 imposes restriction to comments posted by a contributor having posted many "False"-labeled comments. For example, the display mode controller 144 allows displaying of only a third of comments posted by such a contributor. On the other hand, for a contributor having posted many "True"-labeled comments, the display mode controller 144 causes the comments posted by that contributor thereafter in a position that stand out.

The property information obtainer 147 obtains property information containing at least one of viewer profile information, favorite information, or support information indicating the player he/she supports. When the property information obtainer 147 has obtained the property information, the display mode controller 144 controls the display mode of a comment according to the property information.

It should be noted that the property information may be changed by the viewer during a game or may allow no-response. Further, the property information may further contain any one of information indicating whether the viewer is a subscriber of a channel, the viewer's history of playing the game, and the number of supportive messages posted by the viewer.

The display mode controller 144 may cause, on an official distribution screen, a comment from each viewer to be displayed in a color corresponding to a display mode according to the gameplay status and the substance of the comment. The official distribution herein means a set of distribution from an entity independent of the player. Examples of the entity include the game participants, such as a game host, a provider and the like of this service.

The official distribution may distribute, for example, an overhead view screen that provides an overhead view of the entire gameplay status, instead of a view point of any one of the plurality of players. The official distribution may distribute a screen showing an overhead view of the entire gameplay status from a virtual camera or a screen that allows viewing of the gameplay status of each of the plurality of players.

The comments posted by the viewers can be displayed in a plurality of patterns. For example, on a gameplay screen of a distributing player, the display mode controller 144 may cause a distribution screen on which a comment posted for that distribution is superimposed to be displayed.

Further, the display mode controller 144 may cause a comment of a viewer to be displayed in a chat box apart from the gameplay screen. Further, instead of a chat box, a plurality of avatars corresponding to the plurality of viewers, respectively, may be displayed and show their comments in a bubble coming out from an avatar corresponding to the viewer having posted the comment.

In this case, the control of the display mode of each comment performed by the display mode controller 144 may contain a display control of information accompanying the comment. For example, the display mode controller 144 may control the display mode of user information of a viewer having posted a comment, based on the gameplay status or the substance of the comment posted.

The user information is information including at least one of a user name, a user ID, a profile image, an avatar, or the like, and is information for identifying a viewer who has posted a comment. The user information may be displayed in the chat box. Alternatively, the user information may be displayed on another screen when the viewer or the distributor clicks information associated with the posted comment or the comment itself. Alternatively, the user information may be superimposed on the distribution screen.

Specific Example of Distribution Screen and Gameplay Screen

Figure 4:
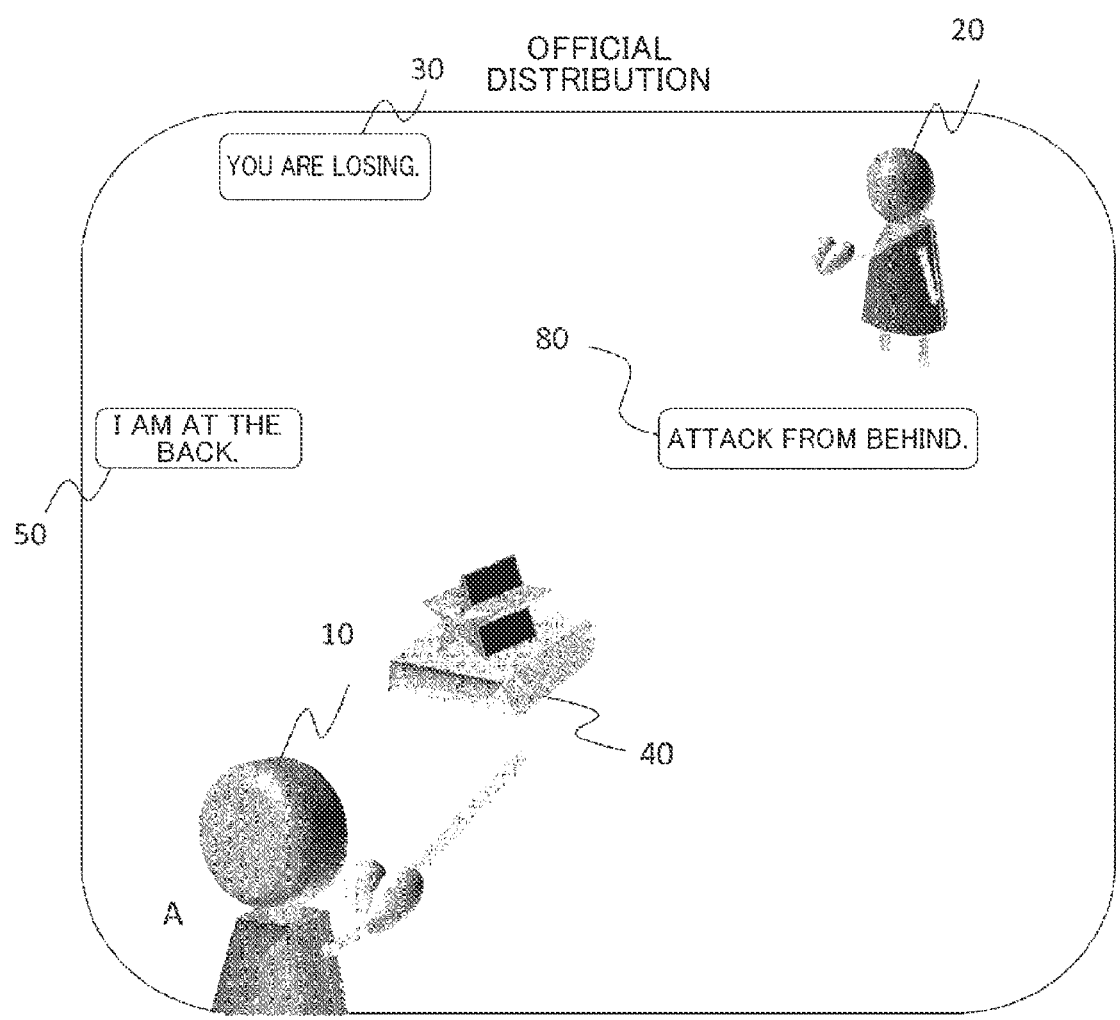
FIG. 4 is a diagram illustrating an example of an officially distributed screen (overhead view screen).
Figure 5:
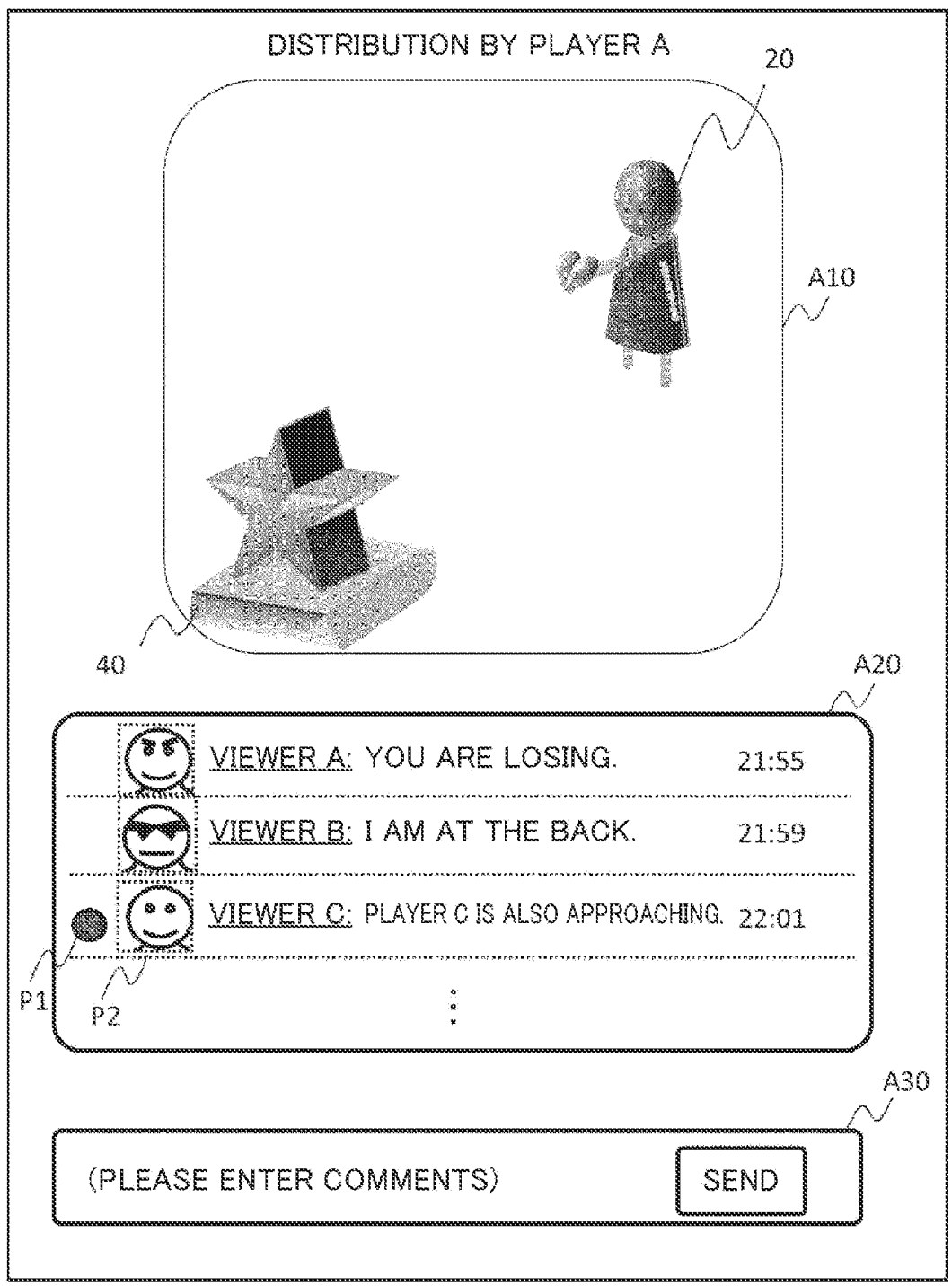
FIG. 5 is a diagram illustrating an exemplary distribution screen from a distribution server in accordance with a modification.

The following describes a specific example of the distribution screen and the gameplay screen with reference to FIG. 3 to FIG. 5.

FIG. 3 is a diagram showing a specific example of a distribution screen of each player. FIG. 3(A) shows a distribution screen of a player A, and FIG. 3(B) shows a distribution screen of a player B. These figures illustrate a state where a character 10 operated by the player A and a character 20 operated by the player B face each other over an obstacle 40. These figures illustrate a space in the game where the player A and the player B compete with each other. It should be noted that a player C (not shown) is also in the same space of the game, although the player C is not visible in the distribution screen.

Specifically, in FIG. 3(A), the character 20 representing the player B, with a gun-like weapon is displayed. In front of the character 20, the obstacle 40 is displayed. It should be noted that this figure illustrates the scene from the view point of the player A (the view point of the character 10). Therefore, the character 10 of the player A is not displayed. The four comments 30, 50, 60, and 70 are viewer-posted comments for the distribution by the player A. These comments 30, 50, 60, and 70 are superimposed on the gameplay screen, and flows from the right side to the left side of the distribution screen.

On the other hand, in FIG. 3(B), the character 10 representing the player A, with a club-like weapon. In front of the character 10, the obstacle 40 is displayed. It should be noted that this figure illustrates the scene from the view point of the player B (the view point of the character 20). Therefore, the character 20 of the player B is not displayed. The four comments 80 and 90 are viewer-posted comments for the distribution by the player B. These comments 80 and 90 are superimposed on the gameplay screen, and flows from the right side to the left side of the distribution screen.

In this example, a gameplay status and a corresponding comment color are registered in the table of the distribution server 100. Further, in the table of the distribution server 100, the substance of a comment (a predetermined keyword) and a corresponding size of the comment, a corresponding color, and a corresponding outer frame are registered. Based on such a table, the distribution server 100 controls the display mode of the comments. Through this control, the comments and the outer frames are displayed in various colors. However, in FIG. 3 and the later-referenced FIG. 4, the various colors are expressed in different grayscale levels, due to limitation of illustration.

Specifically, in FIG. 3(A), the comments 30 and 50 are displayed in a default display mode. On the other hand, the comment 60 indicates that another player, that is, the player C is approaching. Therefore, through the control based on the substance of the comment, the comment 60 is displayed in a color different from the default display mode, and in a greater size than that of the default display mode. The comment 70 indicates that the other player, that is, the player C is in a crisis. Therefore, the comment 70 is displayed in an outer frame thicker than that of the default display mode, and displayed in a format that stands out.

Through such a control of the display mode, the comments 60 and 70 regarding information of another player, out of the plurality of comments 30, 50, 60, and 70 displayed in the distribution screen, are made easily identifiable. It should be noted that the method of coloring and sizing are not limited to the example described above.

Further, in the distribution screen, information of each player such as the weapon, stamina, and the status may be displayed in addition to the gameplay screen. This way, the viewer is able to easily collect information of the player such as the weapon, the position, and the substance of comments.

In FIG. 3(B), the comments 80 and 90 are displayed in the default display mode. The gameplay status is such that the player B is in a crisis, because the stamina of the player B is a predetermined value or lower. Therefore, the comments 80 and 90 displayed in the default display mode are displayed in a different color from the comments 30 and 50 of FIG. 3(A) displayed in the default display mode. This is because the stamina of the player B is not normal, and the player B is on the verge of death.

Through such a control of the display mode, the comments 80 and 90 in the distribution screen are displayed in a display mode according to the gameplay status. In this case, the color of the comments 80 and 90 allows grasping of the gameplay status at a glance, and therefore the effect of the presentation is improved.

FIG. 4 is a diagram illustrating an example of an officially distributed screen (overhead view screen). In this example, the display mode controller 144 combines the comments for two distributions by the player A and the player B and generates a distribution screen providing an overhead view of the entire gameplay status.

This distribution screen is a gameplay screen of a view from a virtual camera, and is a screen that provides an overhead view of the competition status between the player A and the player B. For example, by looking at the official distribution screen, the viewers are able to confirm the positional relation among the character 10 of the player A, the character 20 of the player B, and the obstacle 40.

As illustrated in FIG. 4, also in the official distribution, the comments 30, 50, and 80 posted for the two distribution screens are displayed in display modes similar to those of FIG. 3(A) and FIG. 3(B). It should be noted that the official distribution may display comments in a display mode different from that of the distribution screen of each player.

Now, the following describes a modification of the distribution screen with reference to FIG. 5. The example shows a distribution screen of the player A, which is distributed from the distribution server 100 and displayed on the viewer terminal 400. In this example, the comments posted by viewers for the distribution of the player A are displayed in a display area A20 of a chat box, instead of a display area A10 in the gameplay screen. It should be noted that, in the display area A30, there is a user interface that allows the viewer to post a comment. Further, since the display area A30 is an area with a function to be used by the viewer, the display area A30 does not have to be displayed on the distributor terminal 300 of the player A. Alternatively, the display area A30 may be displayed on the distributor terminal 300 of the player A, so that the player A is able to post a comment after the game is over.

In this example, a marking P1 is displayed on the left side of the comment posted by a viewer C in the chat box. In this control of the display mode, the comment containing a predetermined keyword registered in a table is displayed to stand out by the marking P1. The display mode controller 144 may change a profile image P2 to make the comment containing the predetermined keyword stand out. Further, the display mode controller 144 may change the font or the size of such a comment in the chat box to make the comment stand out.

<Process Flow>

Figure 6:
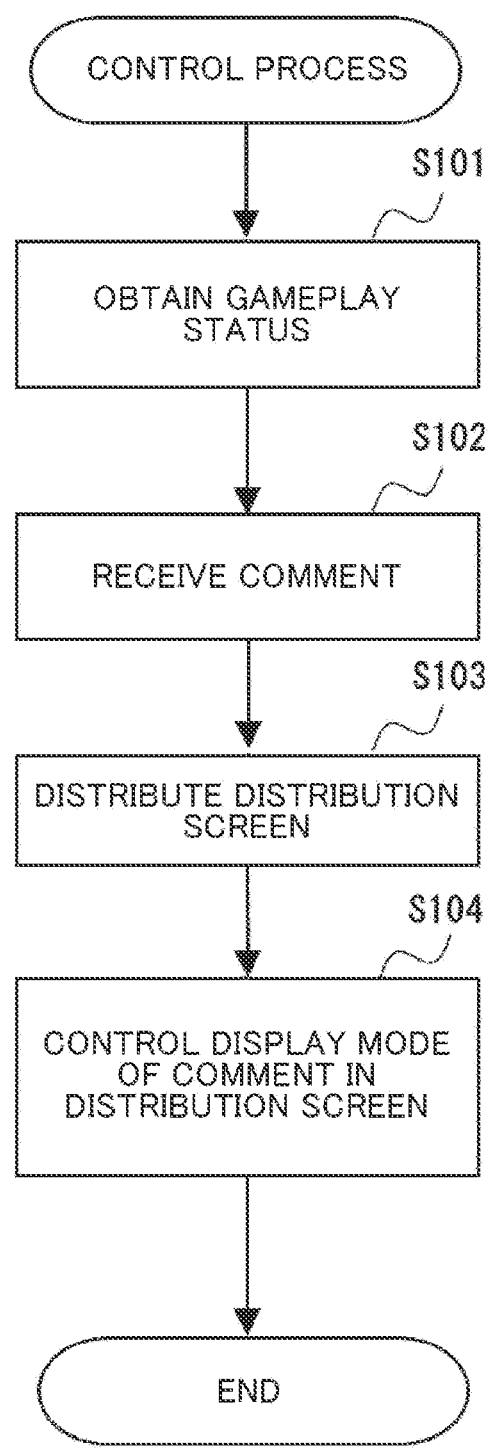
FIG. 6 is a flowchart showing an exemplary control process executed in the distribution server in accordance with the embodiment.

The following describes, with reference to FIG. 6, an exemplary control process executed by the distribution server 100. This process is executed after the game is started.

First, the status obtainer 141 of the controller 140 obtains the gameplay status (step S101). The comment receiver 142 receives a comment posted by a viewer (step S102).

The distribution unit 143 of the controller 140 distributes, to the distributor terminal 300 and the viewer terminal 400, a distribution screen containing the gameplay screen and the comment having been received by the comment receiver 142 (step S103). At this time, audio information such as the sound of the game and an audio input by the distributor is also distributed. The display mode controller 144 of the controller 140 controls the display mode of the comment in the distribution screen distributed by the distribution unit 143, in accordance with the gameplay status obtained by the status obtainer 141 (step S104).

Effects

In a distribution system 1 of the present embodiment, a distribution server 100 that distributes a gameplay screen includes a status obtainer 141 configured to obtain a gameplay status, and a display mode controller 144 configured to control a display mode of a comment according to the gameplay status obtained by the status obtainer 141. Such a distribution system 1 is capable of distributing a gameplay screen of an online game and displaying a viewer-posted comment in a display mode according to a gameplay status. This improves an entertainment characteristic.

In a case of distributing a live video of an online game, a player who is a distributor may progress the gameplay, taking into account comments posted by viewers. However, as the number of comments increase, it is more likely that the player may miss an important comment according to the gameplay status. For the viewers too, it is preferable if an important comment is easier to see. Therefore, an important comment is preferably displayed in a display mode that makes the comment easily seen, according to the gameplay status.

In this regard, the display mode controller 144 of the distribution server 100 controls the display mode of the comment according to the substance of the comment. Therefore, it is possible to make an important comment stand out for the player or the viewer looking at the distribution screen.

The present embodiment is as hereinabove described. It should be noted, however, that the above embodiment is no more than an example. As such, the specific configuration, the details of the process, and the like of the distribution system 1 are not limited to those in the above-described embodiment. In the following, a modification of the above-described embodiment is described. The same reference characters are given to the configuration elements that are the same as those of the distribution system 1 of the above embodiment.

Modification

The sequence of the steps of the control process executed by the distribution server 100 is not limited to those shown in FIG. 6. For example, the gameplay status may be obtained after distribution of the distribution screen, to control the display mode of the distribution screen. The display mode of the comment may be controlled before the distribution of the distribution screen. That is, the sequence of the steps of the control process are modifiable as needed.

In the above-described embodiment, the control for displaying of the distribution screen and the control of the display mode of the distribution screen are executed by the distribution server 100. However, these controls may be executed by the distributor terminal 300 or the viewer terminal 400. Alternatively, these controls may be executed by the distribution server 100 in cooperation with the distributor terminal 300 or the viewer terminal 400.

The status obtainer 141 and the display mode controller 144 may be provided in the distributor terminal 300 or the viewer terminal 400, instead of providing the same in the distribution server 100. As long as the display mode of the distribution screen displayed by the distributor terminal 300 or the viewer terminal 400 is controlled based on a viewing status obtained by the status obtainer 141, the entity that executes the control process is modifiable as needed.

In the distribution system 1 of the above-described embodiment, the distributor terminal 300 and the viewer terminal 400 are configured differently to distinguish one from the other. However, the configuration elements of those devices may be combined to configure a device that functions as the distributor terminal and the viewer terminal.

Further, the distribution system related to the present disclosure is not limited to the above-described devices, and the functions of the system may be achieved by having a computer executing a program. Such a program to achieve the functions of the distribution system 1 may be stored in a computer-readable storage medium such as a Universal Serial Bus (USB) memory, a Compact Disc-Read Only Memory (CD-ROM), a Digital Versatile Disc (DVD), a Hard Disc Drive (HDD), or may be downloaded to a computer through a network.

Although preferred embodiments of the present disclosure have been described above, the present disclosure is not limited to such specific embodiments, and the present disclosure encompasses the invention described in the claims and the scope equivalent thereto. Further, the configurations described in the embodiment and the modification thereof may be suitably combined, provided that such a combination does not cause a technical contradiction.

DESCRIPTION OF REFERENCE CHARACTERS

1 Distribution System
100 Distribution Server
200 Game Server
300 Distributor Terminal
400 Viewer Terminal
110 Communicator
120 Storage
130 Timer
140 Controller
141 Status Obtainer
142 Comment Receiver
143 Distribution Unit
144 Display Mode Controller
145 Setting Receiver
146 Evaluation Obtainer
147 Property Information Obtainer

The invention claimed is:

1. A distribution server comprising:
a communicator configured to receive a comment posted from one of one or more viewer terminals;
a controller configured to:
receive the comment from the communicator;
distribute a distribution screen including a gameplay screen and the comment as live broadcast to the one or more viewer terminals;
control a display mode of the comment, responsive to substance of the comment; and
apply a visual effect to the comment on the distribution screen that distinguishes the comment that includes a gameplay status in the substance of the comment from other comments that do not include the gameplay status in the substance of the comments,
wherein the gameplay status in the substance of the comment indicates at least one of a distance from an enemy being within a predetermined range, the player being attacked by the enemy, the player or an own-side player being in a crisis, or a game of the own-side player being ending.

2. The distribution server of claim 1, wherein
the controller is configured to add an identification or an effect to the comment on the distribution screen.

3. The distribution server of claim 1, wherein
the controller is configured to obtain the gameplay status, based on an image analysis of the gameplay screen or an audio analysis of audio during gameplay.

4. The distribution server of claim 3, wherein
the controller is configured to control the display mode of the comment according to a result of the image analysis or the audio analysis.

5. The distribution server of claim 1, wherein the controller is further configured to receive a setting of categorization according to the gameplay status,
wherein the controller is configured to cause the comment related to the gameplay status to be displayed in a display mode according to the setting of categorization.

6. The distribution server of claim 1, wherein
the controller is configured to cause the comment to be displayed in a specific color according to the gameplay status.

7. The distribution server of claim 1, wherein the controller is further configured to obtain, from the viewer or the player, an evaluation of reliability of the comment,
wherein according to the evaluation obtained, the controller is configured to control the display mode of another comment posted thereafter by a contributor having posted the comment.

8. The distribution server of claim 1, wherein the controller is further configured to obtain property information including at least one of viewer profile information, favorites information, or support information indicating a viewer-supporting player, wherein the controller is configured to control the display mode of the comment according to the property information obtained.

9. The distribution server of claim 8, wherein the property information further includes information indicating at least one of information indicating whether the viewer is a subscriber of a channel, a play history of the online game of the viewer, or a number of supportive messages.

10. A distribution system comprising:
a distribution server configured to distribute a gameplay screen of an online game; and
one or more viewer terminals for viewing the gameplay screen distributed,
wherein the distribution server is configured to receive a comment posted by a viewer from one of the one or more viewer terminals, and to distribute a distribution screen including the gameplay screen and the comment having been received as live broadcast to the one or more viewer terminals,
wherein a distributor terminal used by a player and the one or more viewer terminals are configured to display the distribution screen including the gameplay screen and the comment,
wherein a display mode of the comment is controlled responsive to substance of the comment,
wherein the display mode of the comment includes a visual effect that distinguishes the comment that includes a gameplay status in the substance of the comment from other comments that do not include the gameplay status in the substance of the comments, and
wherein the gameplay status in the substance of the comment indicates at least one of a distance from an enemy being within a predetermined range, the player being attacked by the enemy, the player or an own-side player being in a crisis, or a game of the own-side player being ending.

11. A distribution method of distributing a gameplay screen of an online game, the distribution method comprising:
obtaining a gameplay status of the online game;
receiving a comment posted by a viewer from one of one or more viewer terminals;
distributing a distribution screen including the gameplay screen of the online game and the comment received as live broadcast to the one or more viewer terminals; and
controlling a display mode of the comment, responsive to substance of the comment,
wherein controlling the display mode of the comment includes applying a visual effect to the comment on the distribution screen that distinguishes the comment that includes a gameplay status in the substance of the comment from other comments that do not include the gameplay status in the substance of the comments, and
wherein the gameplay status in the substance of the comment indicates at least one of a distance from an enemy being within a predetermined range, the player being attacked by the enemy, the player or an own-side player being in a crisis, or a game of the own-side player being ending.

12. The distribution method of claim 11, further comprising:
adding an identification or an effect to the comment on the distribution screen.

13. The distribution method of claim 11, further comprising:
obtaining the gameplay status, based on an image analysis of the gameplay screen or an audio analysis of audio during gameplay; and
controlling the display mode of the comment according to a result of the image analysis or the audio analysis.

14. The distribution method of claim 11, further comprising:
controlling the display mode of the comment according to the substance of the comment.

15. The distribution method of claim 11, further comprising:
receiving a setting of categorization according to the gameplay status; and
causing the comment related to the gameplay status to be displayed in a display mode according to the setting of categorization.

16. The distribution method of claim 11, further comprising:
causing the comment to be displayed in a specific color, when the gameplay status obtained by the status obtainer indicates an urgent situation.

17. The distribution method of claim 11, further comprising:
obtaining an evaluation of reliability of the comment from the viewer or the player;
controlling the display mode of a comment posted thereafter by a contributor having posted the comment according to the evaluation.

18. A non-transitory computer readable medium storing a program encoded with instructions which, when executed, cause a computer to execute functions comprising:
receiving a comment posted by a viewer from one of one or more viewer terminals;
distributing a distribution screen containing a gameplay screen and the comment as live broadcast to the one or more viewer terminals;
controlling a display mode of the comment, responsive to substance of the comment; and
applying a visual effect to the comment on the distribution screen that distinguishes the comment that includes a gameplay status in the substance of the comment from other comments that do not include the gameplay status in the substance of the comments,
wherein the gameplay status in the substance of the comment indicates at least one of a distance from an enemy being within a predetermined range, the player being attacked by the enemy, the player or an own-side player being in a crisis, or a game of the own-side player being ending.

* * * * *